United States Patent
Hase et al.

(10) Patent No.: US 10,926,778 B2
(45) Date of Patent: Feb. 23, 2021

(54) AUTONOMOUS VEHICLE CONTROL DEVICE

(71) Applicant: DENSO CORPORATION, Kariya (JP)

(72) Inventors: Tomomi Hase, Kariya (JP); Noriaki Ikemoto, Kariya (JP); Mitsuharu Higashitani, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/377,375

(22) Filed: Apr. 8, 2019

(65) Prior Publication Data

US 2019/0308636 A1 Oct. 10, 2019

(30) Foreign Application Priority Data

Apr. 6, 2018 (JP) .............................. JP2018-073712

(51) Int. Cl.
| | | |
|---|---|---|
| B60Q 1/00 | (2006.01) |
| B60W 50/02 | (2012.01) |
| B60W 50/14 | (2020.01) |
| B60W 50/029 | (2012.01) |
| B60W 30/165 | (2020.01) |

(52) U.S. Cl.
CPC ...... *B60W 50/0205* (2013.01); *B60W 30/165* (2013.01); *B60W 50/029* (2013.01); *B60W 50/14* (2013.01); *B60W 2050/0292* (2013.01); *B60W 2050/146* (2013.01); *B60W 2556/65* (2020.02)

(58) Field of Classification Search
None
See application file for complete search history.

(56) References Cited

U.S. PATENT DOCUMENTS

| 2012/0299718 A1 | 11/2012 | Yoshino et al. | |
|---|---|---|---|
| 2019/0084565 A1* | 3/2019 | Dudar | B60W 20/50 |

FOREIGN PATENT DOCUMENTS

| JP | 2014-040172 A | 3/2014 |
|---|---|---|
| JP | 2015-199363 A | 11/2015 |
| JP | 2017-087831 A | 5/2017 |

* cited by examiner

*Primary Examiner* — Julie B Lieu
(74) *Attorney, Agent, or Firm* — Oliff PLC

(57) ABSTRACT

An autonomous vehicle control device for controlling an own vehicle that is an autonomous vehicle including an alarm sound output device which outputs alarm sound for at least a person. In the autonomous vehicle control device, a determination unit determines whether there is an abnormality in the alarm sound output device during execution of autonomous driving. When the determination unit determines that there is an abnormality in the alarm sound output device, a safety assurance unit performs a safety assurance process for assuring human safety.

12 Claims, 19 Drawing Sheets

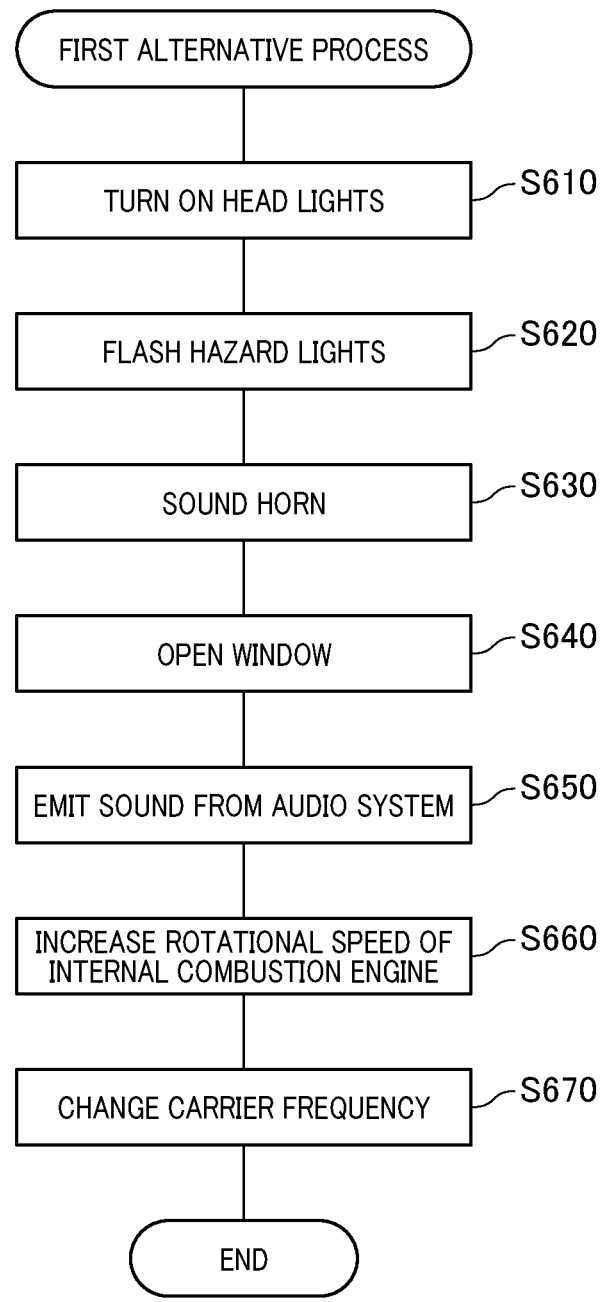

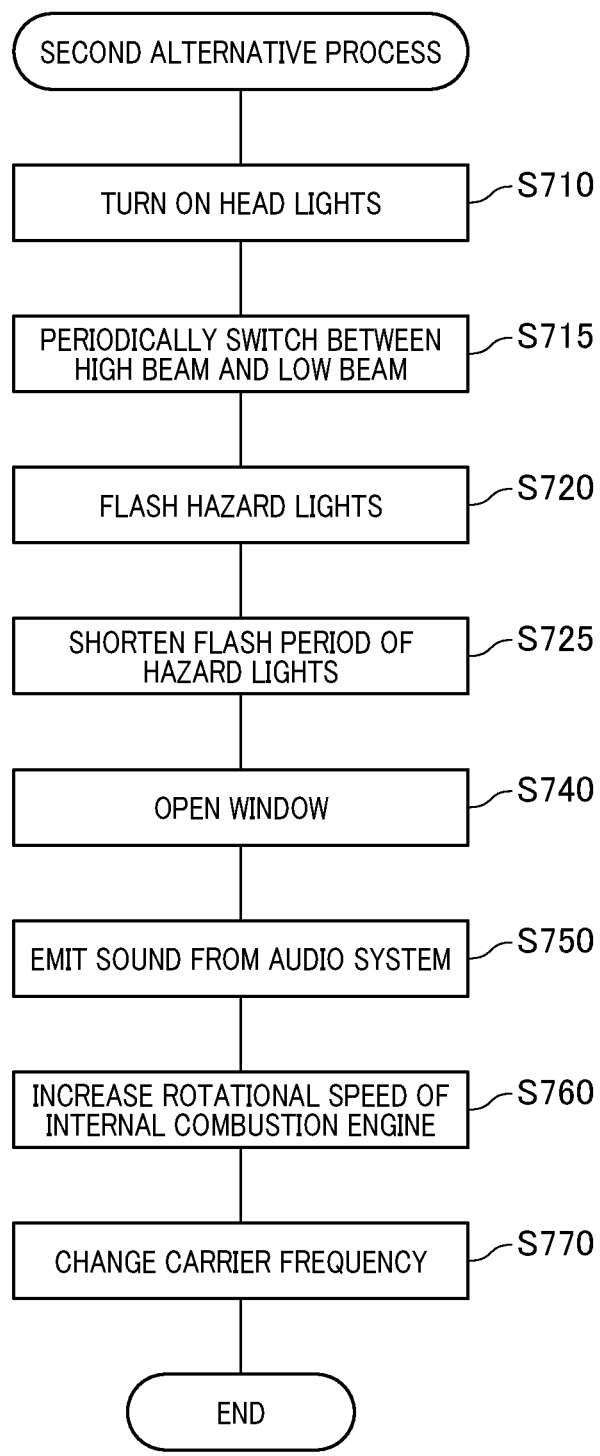

AUTONOMOUS VEHICLE CONTROL DEVICE

CROSS-REFERENCE TO RELATED APPLICATION

This application is based on and claims the benefit of priority from earlier Japanese Patent Application No. 2018-73712 filed Apr. 6, 2018, the description of which is incorporated herein by reference.

BACKGROUND

Technical Field

The present disclosure relates to an alarm sound which an automobile emits.

Related Art

Conventionally, a method is known, in which when a sound emission control signal commanding emission or attenuation of a human approach notification sound is abnormal, sound is emitted independently of the sound emission control signal while an automobile is traveling.

There is a need for assuring human safety when an abnormality occurs in a device that outputs an alarm sound.

SUMMARY

One aspect of the present disclosure provides an autonomous vehicle control device for controlling an own vehicle that is an autonomous vehicle including an alarm sound output device which outputs an alarm sound for at least a person. In the autonomous vehicle control device, a determination unit determines whether there is an abnormality in the alarm sound output device during execution of autonomous driving. When the determination unit determines that there is an abnormality in the alarm sound output device, a safety assurance unit performs a safety assurance process for assuring human safety.

BRIEF DESCRIPTION OF THE DRAWINGS

In the accompanying drawings:

FIG. 18 is a flowchart showing a first alternative process; and

FIG. 19 is a flowchart showing a second alternative process.

DETAILED DESCRIPTION OF THE PREFERRED EMBODIMENTS

First Embodiment

Figure 1:
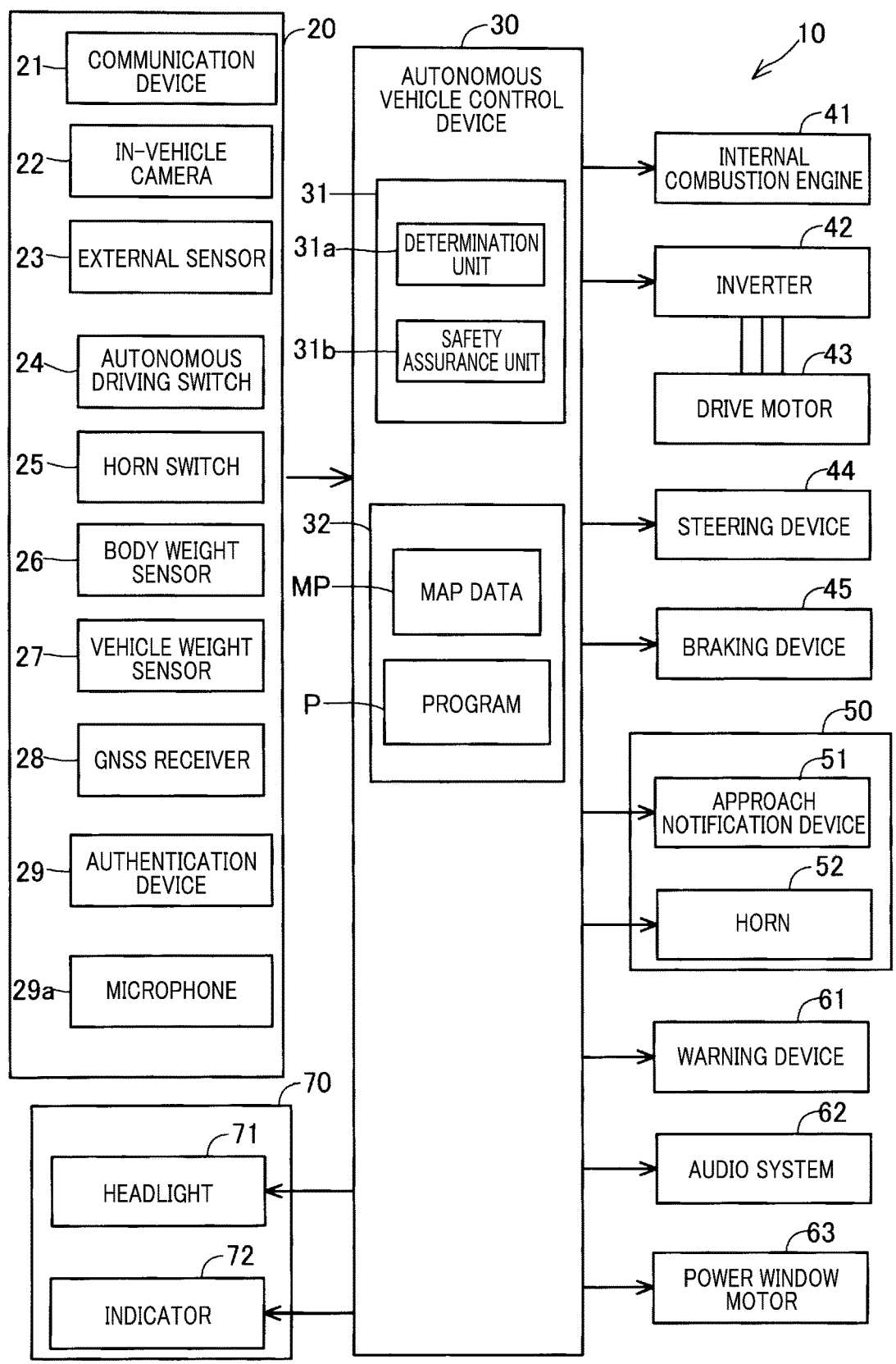
FIG. 1 is a block diagram showing an internal configuration of an autonomous vehicle.

An autonomous vehicle 10 shown in FIG. 1 has an autonomous driving function (at a level higher than or equal to level 3) that does not necessarily requires monitoring by a driver. The autonomous vehicle 10 includes an information obtainment device group 20, an autonomous vehicle control device 30, an internal combustion engine 41, an inverter 42, a travel motor 43, a steering device 44, a braking device 45, an alarm sound output device 50, a warning device 61, an audio system 62, a power window motor 63, and a light-emitting device 70.

The information obtainment device group 20 includes a communication device 21, an in-vehicle camera 22, an external sensor 23, an autonomous driving switch 24, a horn switch 25, a body weight sensor 26, a vehicle weight sensor 27, a GNSS receiver 28, an authentication device 29, and a microphone 29a. Information obtained by each element included in the information obtainment device group 20 is input to the autonomous vehicle control device 30.

The communication device 21 performs road-to-vehicle communication and inter-vehicle communication. The in-vehicle camera 22 captures an image of the interior of a vehicle. The result of capturing the image is used in a later-described process to determine the presence or absence of a driver.

The external sensor 23 includes a camera, a millimeter wave radar, a LIDAR, and an ultrasonic sonar. The LIDAR, which stands for Light Detection and Ranging, is a distance measurement device using a laser. The camera includes one or more modules and covers at least areas in front of and behind the own vehicle as an image capture range. Each of the millimeter wave radar, the LIDAR, and the ultrasonic sonar also includes one or more modules and is designed, as appropriate, to have a sensing range covering an area surrounding the own vehicle. Information obtained by the external sensor 23 is used to detect a pedestrian or the like located around the own vehicle. The external sensor 23 according to another embodiment may exclude some of the aforementioned sensors and may include other sensors.

The autonomous driving switch 24 is an input interface for switching autonomous driving between ON and OFF states. The case simply called autonomous driving in the present embodiment means autonomous driving at a level higher than or equal to level 3 which does not necessarily require monitoring by a driver. Autonomous driving in a broad sense at a level lower than or equal to level 2 which requires monitoring by a driver is not called autonomous driving in the present embodiment.

The horn switch 25 is an input interface for causing a horn 52 to output sound and is provided on a steering wheel. The body weight sensor 26 measures the weight of a person, baggage, or the like located on each seat of autonomous vehicle 10. The measurement value is used in a later-described process to determine the presence or absence of a driver.

The GNSS receiver 28 measures the longitude and the latitude of the current location of the autonomous vehicle 10 on the basis of a navigation signal received from a navigation satellite. The authentication device 29 performs reading and verification operations for performing biometric authentication (for example, fingerprint authentication). The result of the authentication by the authentication device 29 is not only used for crime prevention by determining whether or not an operation is performed by a registered driver, but also used in a later-described process to determine the presence or absence of a driver. The microphone 29a collects sound outside the own vehicle.

The internal combustion engine 41 generates travel torque. The internal combustion engine 41 according to another embodiment may generate, instead of the travel torque, torque for power generation by a generator. The autonomous vehicle control device 30 controls the rotational speed of the internal combustion engine 41.

The inverter 42 converts electric power for driving travel motor 43. The travel motor 43 generates travel torque using electric power supplied from the inverter 42. The autonomous vehicle control device 30 controls the carrier frequency of the inverter 42.

The alarm sound output device 50 includes an approach notification device 51 and a horn 52. The approach notification device 51 outputs an alarm sound for persons. The autonomous vehicle control device 30 causes the approach notification device 51 to output the alarm sound when the own vehicle is traveling at a predetermined speed (for example, 25 km/h) or less and when the own vehicle is moving backwards. A person in the present embodiment includes a pedestrian and a person riding a two-wheeler. The two-wheeler includes a bicycle and a motorcycle.

The horn 52 outputs an alarm sound. The alarm sound is output to warn a person and another vehicle located around the own vehicle. When the horn switch 25 is operated and when determining during execution of autonomous driving that output of the alarm sound is instructed in a regulation, the autonomous vehicle control device 30 causes the horn 52 to output the alarm sound. Examples of the case where the output of the alarm sound is instructed in a regulation include the case where the own vehicle is traveling in areas indicated by a sign reading "Sound Horn" and a sign reading "Horn Zone". Hereinafter, these signs will be collectively called a horn sign. The horn sign is recognized through image recognition using the camera included in the external sensor 23 and by use of data of signs included in map data MP.

The warning device 61 warns a driver using display on an instrument panel, sound output from a loudspeaker, and so on. The audio system 62 is a device for playing music, etc. The power window motor 63 is for opening and closing a power window. Each of the warning device 61, the audio system 62, and the power window motor 63 operates under control of autonomous vehicle control device 30.

The light-emitting device 70 includes a headlight 71 and an indicator 72. When operated by a driver or when determining that the current situation requires light emission, the autonomous vehicle control device 30 causes each of the headlight 71 and the indicator 72 to emit light.

The autonomous vehicle control device 30 includes one or more ECUs. The autonomous vehicle control device 30 includes a central processing unit (CPU) 31 and a storage medium 32 including a random access memory (RAM), a read only memory (ROM), and flash, etc. The storage medium 32 is configured from a non-transitory, tangible storage medium such as a semiconductor memory, for example. In some other embodiments, various processes to be performed as described later in the autonomous vehicle control device 30 may be implemented by a logic circuit or an analog circuit or the like.

The storage medium 32 stores the map data MP and a program P. The map data MP includes information about road structures, signs installed on roads, and so on. The program P is for implementing a stop position control process to be described later. Note that the CPU 31 functions as a determination unit 31a and a safety assurance unit 31b by performing an autonomous vehicle control process. The relationship between each step in the autonomous vehicle control process and the determination unit 31a and the safety assurance unit 31b will be described after description of embodiments.

Figure 2:
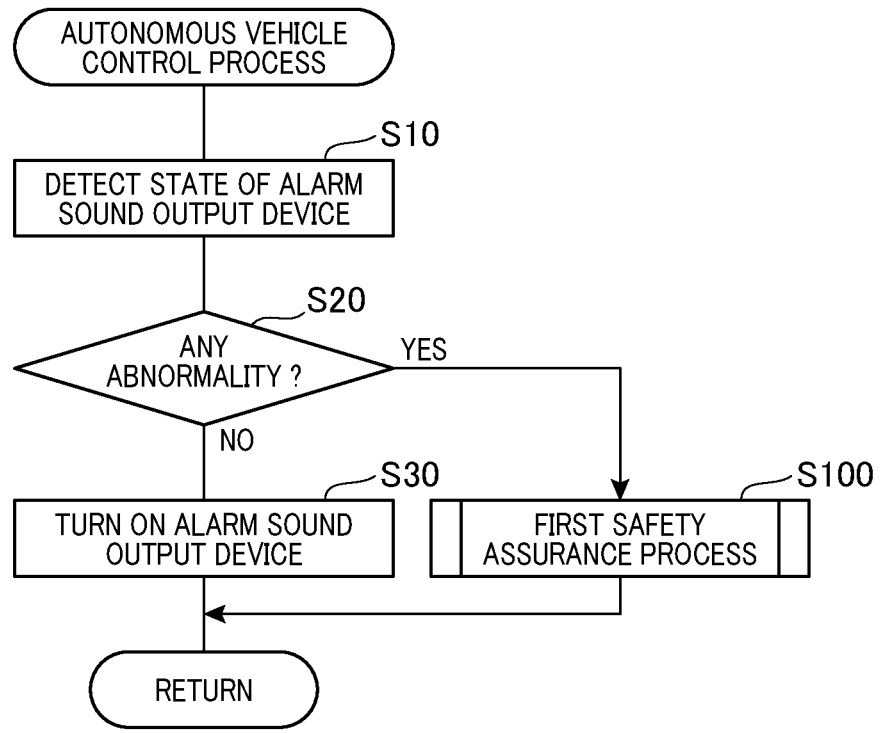
FIG. 2 is a flowchart showing an autonomous vehicle control process according to a first embodiment.

The CPU 31 proceeds to S10 shown in FIG. 2 and detects the state of the alarm sound output device 50. Specifically, using the results of disconnection detection based on an electric current value and the sound collection by the microphone 29a, the CPU 31 determines whether each of the approach notification device 51 and the horn 52 normally operates.

Subsequently, the CPU 31 proceeds to S20 and determines whether there is an abnormality in the alarm sound output device 50 on the basis of the detection result in S10. When there is no abnormality, the CPU 31 determines S20 as "NO", that is, the CPU 31 makes a "NO" determination at step S20, proceeds to S30, and sets the alarm sound output device 50 to ON so that the alarm sound output device 50 operates as usual. On the other hand, when there is an abnormality, the CPU 31 performs the first safety assurance process. The first safety assurance process is intended to assure safety including human safety.

Figure 3:
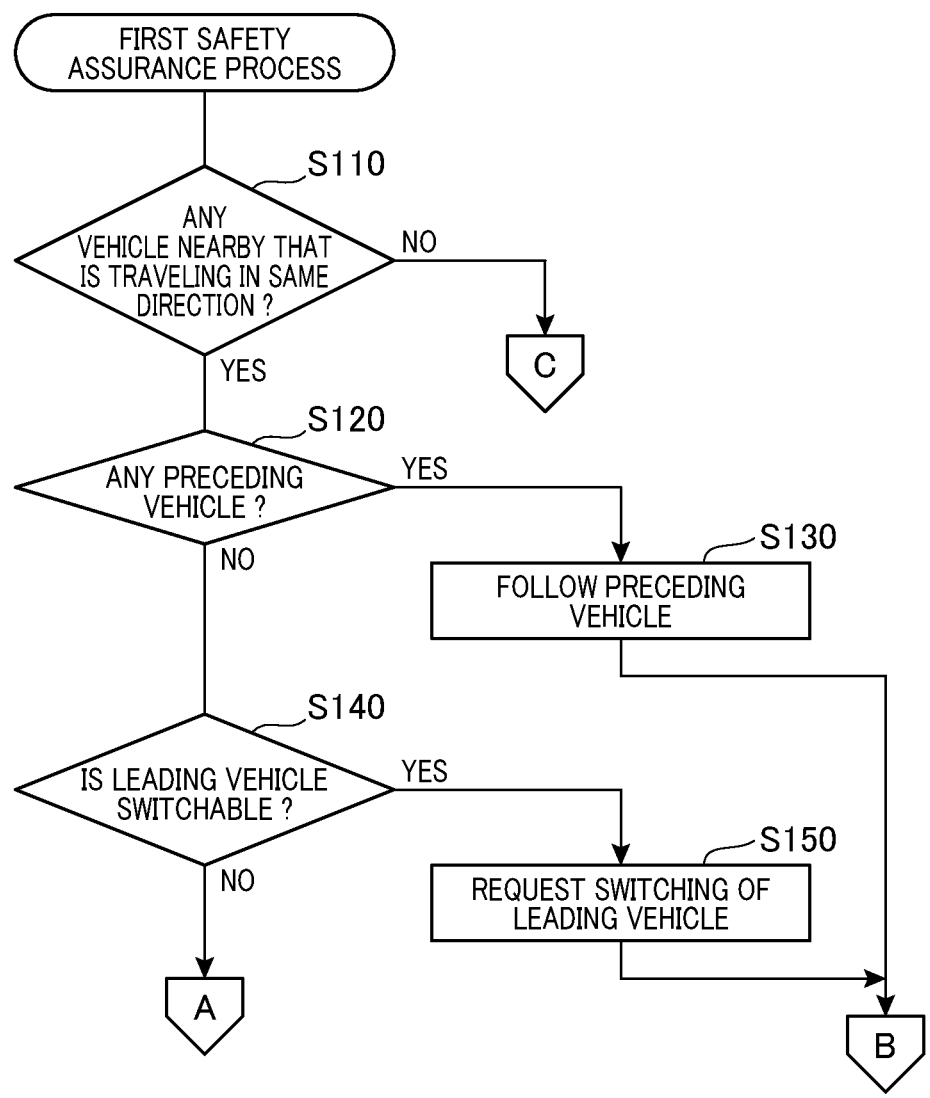
FIG. 3 is a flowchart showing a first safety assurance process.

As shown in FIG. 3, when the first safety assurance process is started, the CPU 31 proceeds to S110 and determines whether there is any vehicle traveling in the same direction. In this determination, the inter-vehicle communication and the sensing result from the external sensor 23 are used.

When there is a vehicle traveling in the same direction, the CPU 31 determines S110 as "YES", that is, the CPU 31 makes an "YES" determination at step S110, proceeds to S120, and determines whether there is any preceding vehicle that can be followed. This determination is made on the basis of the information obtained by the communication device 21 and the information obtained by the external sensor 23. The information obtained by the communication device 21 is information obtained by way of at least one of the inter-vehicle communication and the road-to-vehicle communication.

Figure 4:
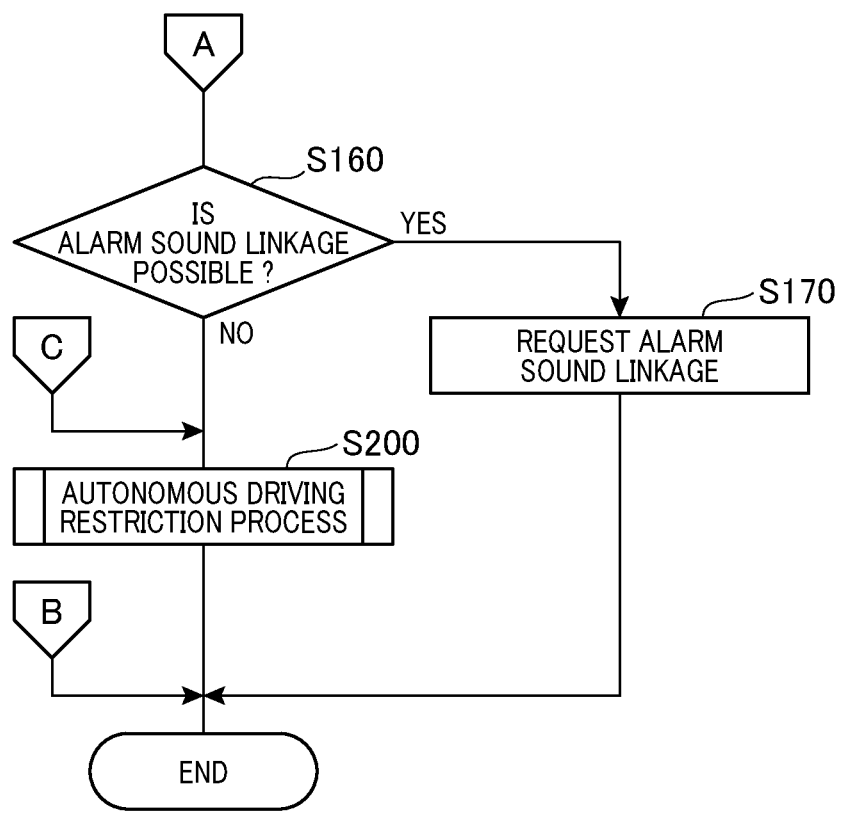
FIG. 4 is a flowchart showing a first safety assurance process.

As shown in FIG. 4, when there is a preceding vehicle to be followed, the CPU 31 determines S120 as "YES", proceeds to S130, causes the own vehicle to follow the preceding vehicle, and ends the first safety assurance process. Following the preceding vehicle means traveling in a manner to keep each of the inter-vehicular distance and the difference in speed between the preceding vehicle and the own vehicle within a predetermined range, for example.

Even when there is an abnormality in the alarm sound output device 50, traveling following the preceding vehicle reduces the likelihood of collision with a person (for example, a pedestrian), and thus safety is assured.

On the other hand, when there is no preceding vehicle to be followed, this means that the own vehicle is a leading vehicle. In this case, the CPU 31 determines S120 as "NO", proceeds to S140, and determines whether the leading vehicle is switchable. In this determination, the inter-vehicle communication is used. Specifically, a following vehicle or a vehicle traveling alongside is inquired as to whether the vehicle can travel ahead of the own vehicle and whether the alarm sound output device is normal. Subsequently, when responses to both the inquiries are affirmative, S140 is determined as "YES".

When the leading vehicle is switchable, the CPU 31 determines S140 as "YES" as mentioned above, proceeds to S150, requests the vehicle that has been inquired to switch the leading vehicle, and ends the first safety assurance process. When the leading vehicle is switched, safety is assured, as described above. In addition, since it has been confirmed that the alarm sound output device of the new leading vehicle is normal, safety is further assured.

A following vehicle or a vehicle traveling alongside with which the inter-vehicle communication is not established may be followed. In other words, a following vehicle or a vehicle traveling alongside may be followed without connection thereto via wireless communication. In the case where the following vehicle is to be followed, in order to follow the following vehicle, the own vehicle may pull to a road shoulder and turn on hazard lights to encourage passing, and after being passed, may follow said vehicle, maintaining a predetermined distance. In the case where the vehicle traveling alongside is to be followed, the speed of the own vehicle may be adjusted to position the own vehicle behind said vehicle that had been traveling alongside. The own vehicle may change lanes to position itself behind the vehicle that had been traveling alongside and may follow said vehicle, maintaining a predetermined distance.

In the case of performing a process of being passed by the following vehicle as in the above-described process, the external sensor 23 (specifically, the camera) may detect the width of the road, and when the width of the road is greater than or equal to a predetermined width (for example, a width enough to accommodate the total width of at least two vehicles plus a margin), and when passing is possible, the process may be performed.

On the other hand, when the leading vehicle is not switchable, the CPU 31 determines S140 as "NO", proceeds to S160 shown in FIG. 4, and determines whether alarm sound linkage is possible. The alarm sound linkage means that another vehicle such as the following vehicle outputs a louder alarm sound, as appropriate, in order to reduce the likelihood of collision between a person and the own vehicle as the leading vehicle.

In this determination, the inter-vehicle communication is used. Specifically, the alarm sound linkage is requested via the inter-vehicle communication, and when a response indicating that the alarm sound linkage is possible is obtained, the result of the determination is affirmative. In the case where the alarm sound linkage is possible, S160 is determined as "YES", the processing proceeds to S170, a vehicle capable of the alarm sound linkage is requested to effect said linkage, and the first safety assurance process ends.

On the other hand, when the alarm sound linkage is not possible, S160 is determined as "NO", the processing proceeds to S200, the autonomous driving restriction process is performed, and the first safety assurance process ends. When there is no vehicle nearby that is traveling in the same direction in S110, CPU 31 determines S110 as "NO", proceeds to S200, performs the autonomous driving restriction process, and ends the first safety assurance process. The autonomous driving restriction process is for assuring safety by restricting autonomous driving, as appropriate, and will be described in detail in a second embodiment.

According to the first embodiment described above, safety can be assured by linkage with a nearby vehicle when there is an abnormality in the alarm sound output device 50. Note that a linkage vehicle may be requested to, when the request is received, output a louder sound than under normal circumstances.

Second Embodiment

The second embodiment will be described. Description of the second embodiment will focus on differences from the first embodiment. Features not particularly described are the same as those in the first embodiment.

Figure 5:
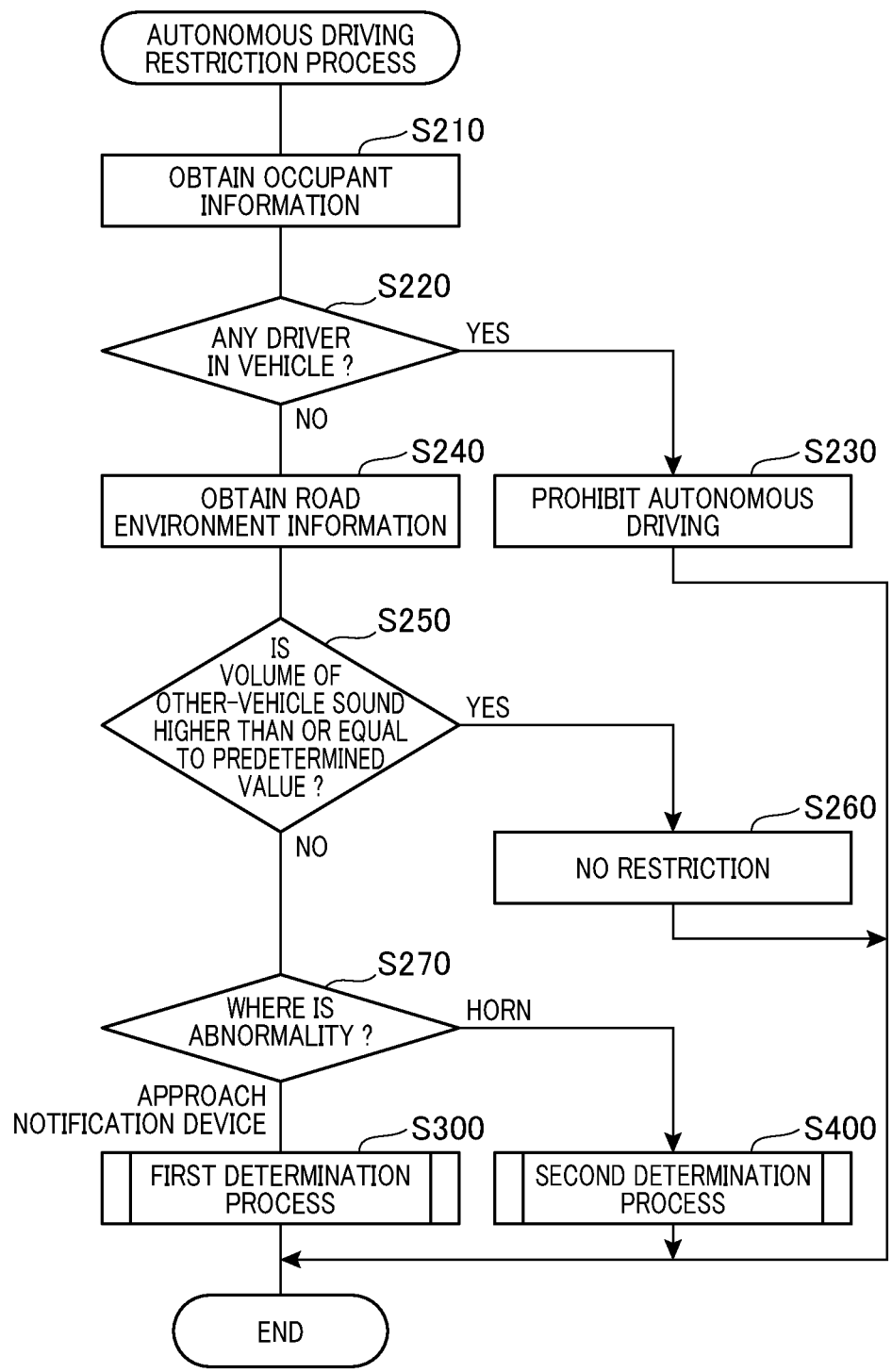
FIG. 5 is a flowchart showing an autonomous driving restriction process.

As shown in FIG. 5, when the autonomous driving restriction process shown as S200 in FIG. 4 starts, the CPU 31 obtains occupant information. Specifically, whether there is any driver in the vehicle is determined using information obtained from the in-vehicle camera 22, the body weight sensor 26, and the vehicle weight sensor 27. Next, the CPU 31 proceeds to S220 and determines, on the basis of the result of S210, whether there is any driver in the vehicle.

Note that whether or not there is a driver in the vehicle may be determined according to whether or not there is an occupant in the driver seat. Alternatively, the presence or absence of a driver may be determined according to whether or not there is an occupant in the vehicle who can drive. Whether or not a person can drive can be determined by obtaining, in advance, information of whether or not licensed as a driver, through presentation, advanced registration, or the like, and then using the in-vehicle camera 22 to verify the person against the information of whether or not licensed. It may be determined that there is a driver in the vehicle when both of these conditions are met, that is, when there is a licensed person in the driver seat.

When there is a driver in the vehicle, the CPU 31 determines S220 as "YES", proceeds to S230, prohibits autonomous driving at a level higher than or equal to level 3, and ends the autonomous driving restriction process. In the case where autonomous driving is interpreted in a broad sense, the processing in S230 may be stated differently as restricting autonomous driving. As a result of prohibiting the autonomous driving at a level higher than or equal to level 3, monitoring by the driver is carried out. Thus, safety can be assured with the recognition and determination of the driver.

On the other hand, when there is no driver in the vehicle, prohibiting autonomous driving is not preferred. In this case, the CPU 31 determines S220 as "NO", proceeds to S240, and obtains road environment information. The road environment information is specifically information of the volume of sound emitted by another vehicle traveling near the own vehicle (hereinafter referred to as other-vehicle sound). The volume of sound is obtained using the microphone 29a.

Next, the CPU 31 proceeds to S250 and determines whether the volume of the other-vehicle sound is higher than or equal to a predetermined value. When the volume of the other-vehicle sound is higher than or equal to the predetermined value, the CPU 31 proceeds to S260, and ends the autonomous driving restriction process without restricting autonomous driving. When the volume of the other-vehicle sound is higher than or equal to the predetermined value, since safety is assured, the autonomous driving need not be restricted.

On the other hand, when the volume of the other-vehicle sound is lower than the predetermined value, the CPU 31 proceeds to S270 and determines whether there is an abnormality in the approach notification device 51 or the horn 52. When there is an abnormality in the approach notification device 51, the CPU 31 proceeds to S300 and performs the first determination process. When there is an abnormality in the horn 52, the CPU 31 proceeds to S400 and performs the second determination process.

Figure 6:
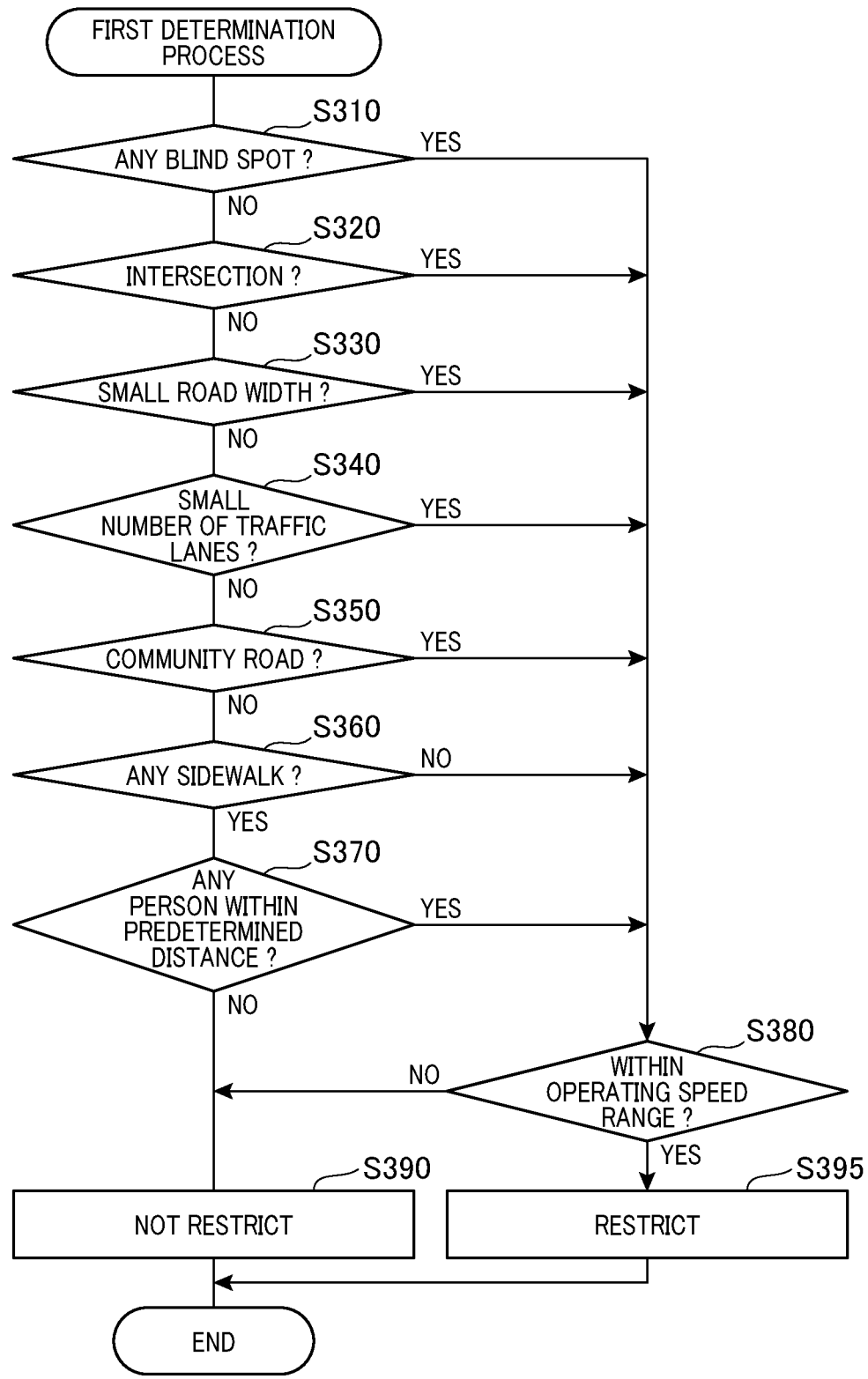
FIG. 6 is a flowchart showing a first determination process.

As shown in FIG. 6, when the first determination process is started, the CPU 31 proceeds to S310 and determines whether there is any blind spot. The blind spot in the present embodiment refers to an area which is an inherent sensing range of the external sensor 23, but the information of which is not obtainable due to an obstacle or the like, leading to a risk of meeting collision. However, even in the case where there is a blind spot, when the position of the blind spot is so far away from the own vehicle that the collision can be certainly avoided by braking, steering, and the like, it is determined in S310 that there is no blind spot. Whether or not the collision can be certainly avoided is determined according to whether or not the distance to the blind spot is greater than a predetermined distance.

In S310, whether or not the structure of the road satisfies a specific condition (specifically, the presence or absence of a blind spot) is determined. Each of S320 to S370 to be described later and S410, S430, S440, S450, and S460 in the second determination process to be described later is a step for determining whether or not the structure of the road satisfies the specific condition.

In the determination of the presence or absence of a blind spot, information from the external sensor 23 and information such as the structure of the road obtained from the map data MP and the like are compared, and when there is a difference, it may be determined that there is a blind spot.

When there is no blind spot, the CPU 31 determines S310 as "NO", proceeds to S320, and determines whether or not the current location is close to an intersection. Since an intersection is where the likelihood of collision is high, this determination is performed.

When the current location is not close to an intersection, the CPU 31 determines S320 as "NO", proceeds to S330, and determines whether the width of the road is less than a predetermined width. This determination is performed with reference to the map data MP and the information obtained by the external sensor 23. When the width of the road is less than the predetermined width, the likelihood of collision with a person is high, and therefore this determination is performed.

When the width of the road is greater than or equal to the predetermined width, the CPU 31 determines S330 as "NO", proceeds to S340, and determines whether the number of traffic lanes on the road on which the own vehicle is traveling is small. Specifically, when the road is one of a single-lane road, a two-lane road with a single lane in each direction, and a one-way road, the number of traffic lanes is determined as small. When the road has two or more lanes in each direction, the number of traffic lanes is determined as large. This determination is performed with reference to the map data MP and the information obtained by the external sensor 23. When the number of traffic lanes is small, the likelihood of collision with a person is high, and therefore this determination is performed.

When the number of traffic lanes is large, the CPU 31 determines S340 as "NO", proceeds to S350, and determines whether the road on which the own vehicle is traveling is a community road. The community road refers to a road that connects a residential house or the like and an arterial road. This determination is performed with reference to the map data MP. Since the likelihood of collision with a person is higher in the community road than in the arterial road, this determination is performed.

When the road on which the own vehicle is traveling is not a community road, the CPU 31 determines S350 as "NO", proceeds to 360, and determines whether or not the road has a sidewalk. Since the presence or absence of a sidewalk influences the likelihood of collision with a person, this determination is performed.

When the road has a sidewalk, the CPU 31 determines S360 as "YES", proceeds to S370, and determines whether there is any person (for example, one of a pedestrian, a bicycle, and a motorcycle) within a predetermined distance. When there is no person within the predetermined distance, the likelihood of collision with a person is low, and thus this determination is performed to confirm this.

When there is no person within the predetermined distance, the CPU 31 determines S370 as "NO", proceeds to S390, ends the first determination process without restricting autonomous driving, and ends the autonomous driving restriction process. Details of the restriction will be described later.

On the other hand, when any of S310 to S350 and S370 is determined as "YES" or S360 is determined as "NO", the processing proceeds to S380, and whether the current vehicle speed is within an operating speed range of the approach notification device 51 is determined. When the current vehicle speed is out of the operating speed range of the approach notification device 51, the CPU 31 determines S380 as "NO" and proceeds to S390.

On the other hand, when the current vehicle speed is within the operating speed range of the approach notification device 51, the CPU 31 determines S380 as "YES", proceeds to S395, restricts autonomous driving, and ends the first determination process.

In the present embodiment, the above-described restriction is a speed restriction and prohibition of passing another vehicle. In another embodiment, one of the speed restriction and the prohibition of passing may be applied.

The speed restriction is specifically limiting the speed to less than or equal to the operating speed of the approach notification device 51. Furthermore, the speed restriction may be implemented as stopping for a moment at an intersection with no road signs or letters painted on a road surface that indicate "Stop". This is because the speed becomes lower than usual in an intersection. Furthermore, when there is a person ahead, the speed may be set to lower than or equal to the traveling speed of that person. In other words, the speed may be limited to a speed at which the own vehicle does not pass a person. The speed restriction to be applied may be any one of the aforementioned options.

The prohibition of passing means prohibiting the own vehicle from passing a preceding vehicle in the case where the preceding vehicle temporarily moves toward a road shoulder or prohibiting the own vehicle from passing a preceding vehicle by changing the positional relationship on the road such as changing traffic lanes. Whether or not to apply the prohibition of passing may be determined according to the type of a vehicle to be passed or may be determined independently of the type of a vehicle. For example, the prohibition of passing may be applied when the vehicle to be passed is a bus, but not applied when the vehicle to be passed is other than a bus. For example, in the case of a bus that has stopped at a bus stop (particularly, in the case of a school bus), there is a possibility that a person may cross the road after exiting the bus; thus, when the approach notification device 51 is not operating, the prohibition of passing is preferably applied in order to avoid collision.

Figure 7:
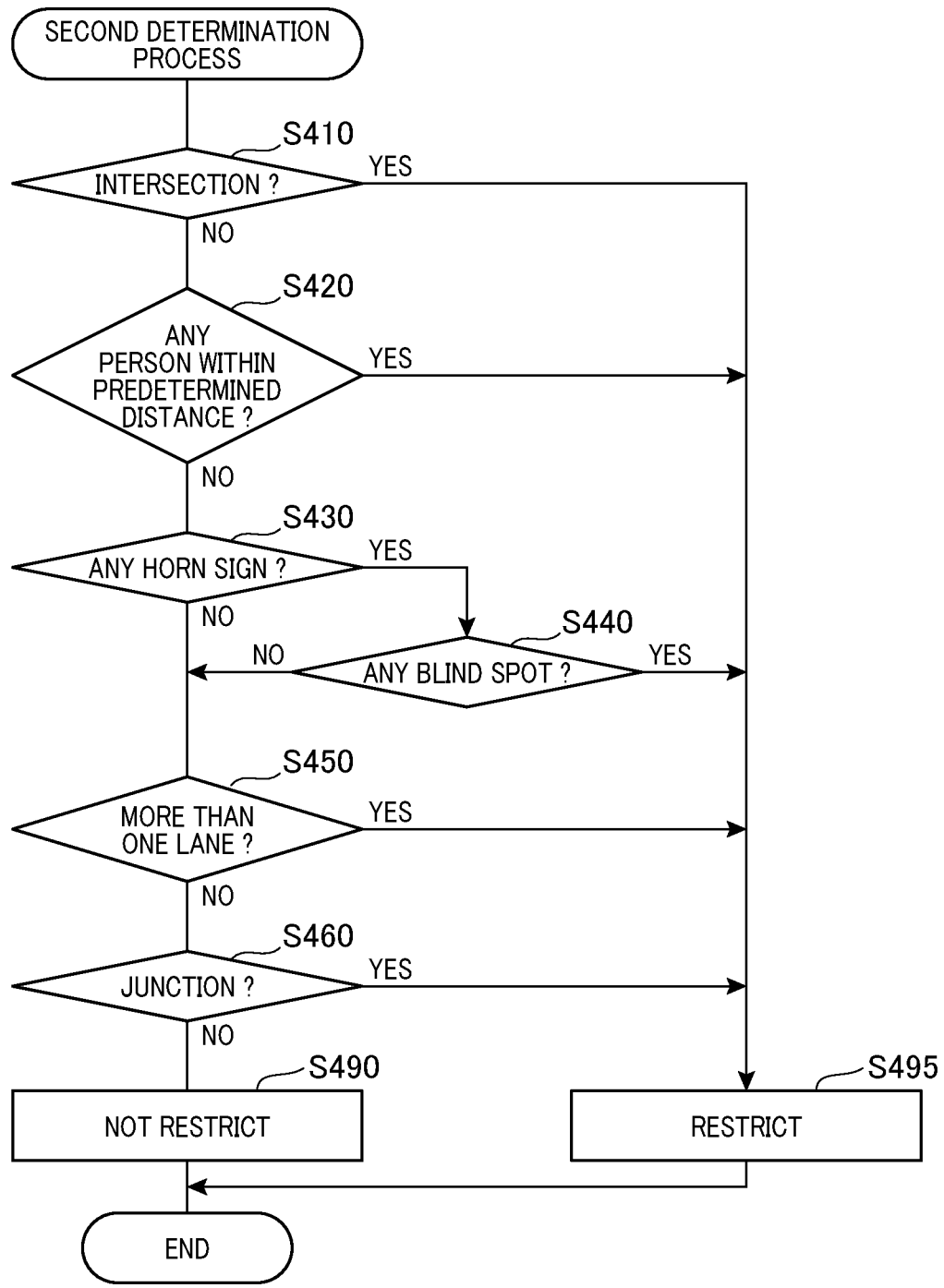
FIG. 7 is a flowchart showing a second determination process.

On the other hand, as shown in FIG. 5, in the case where there is an abnormality in the horn 52, the CPU 31 proceeds from S270 to S400 and performs the second determination process shown in FIG. 7.

When the second determination process is started, the CPU 31 proceeds to S410 and determines whether the current location is close to an intersection. S410 is a determination step similar in method and purpose to S310. When the approach notification device 51 is normal and the current vehicle speed is in the operating speed range of the approach notification device 51, the likelihood of collision with a person is low. However, in view of the case where the current vehicle speed is out of the operating speed range of the approach notification device 51 and the fact that there is a possibility of collision with another vehicle, whether or not the current location is close to an intersection is also determined in the second determination process.

When the current location is not close to an intersection, the CPU 31 determines S410 as "NO", proceeds to S420, and determines whether there is a person within a predetermined distance. S420 is a determination step similar in method and purpose to S370. Note that the predetermined distance in S370 and the predetermined distance in S420 may be the same or may be different. Furthermore, each predetermined distance may be a variable value; for example, the predetermined distance may increase as the speed increases.

When there is no person within the predetermined distance, the CPU 31 determines S420 as "NO", proceeds to S430, and determines whether there is a horn sign.

When there is a horn sign, the CPU 31 determines S430 as "YES", proceeds to S440, and determines whether there is a blind spot. When there is no blind spot, the CPU 31 determines S440 as "NO" and proceeds to S450. When there is no horn sign, the CPU 31 determines S430 as "NO" and proceeds to S450.

In S450, the CPU 31 determines whether the road on which the own vehicle is traveling has more than one lane. This determination is performed with reference to the map data MP and the information obtained by the external sensor 23.

When the road on which the own vehicle is traveling has a single lane, S450 is determined as "NO", the processing proceeds to S460, and whether the current location is close to a junction is determined. The junction refers to a point where a main route and a rampway meet on a freeway or a point of this sort.

When the current location is not close to a junction, the CPU 31 determines S460 as "NO", proceeds to S490, and ends the second determination process without restricting autonomous driving.

On the other hand, when any of S410, S420, and S440 to S460 is determined as "YES", the CPU 31 proceeds to S495, restricts autonomous driving, and ends the second determination process.

According to the second embodiment described above, even when an abnormality occurs in any of the approach notification device 51 and the horn 52, whether or not the autonomous driving needs to be restricted is properly determined, and then the autonomous driving can be restricted.

Third Embodiment

The third embodiment will be described. Description of the third embodiment will focus on differences from the second embodiment. Features not particularly described are the same as those in the second embodiment.

Figure 8:
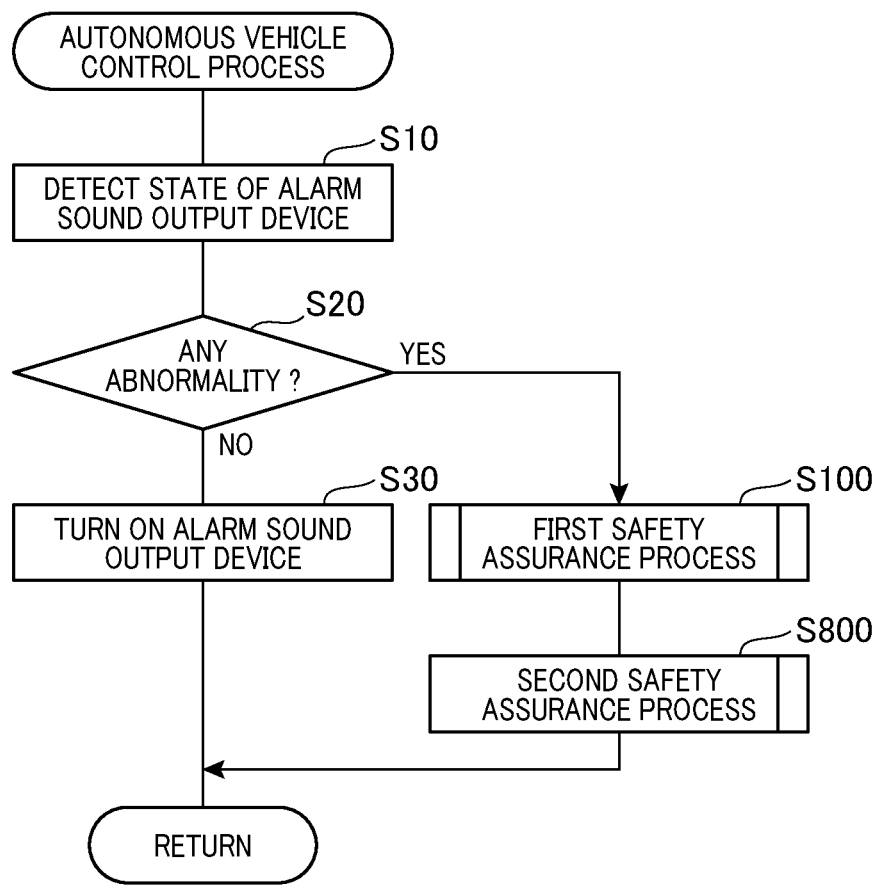
FIG. 8 is a flowchart showing an autonomous vehicle control process according to a third embodiment.
Figure 9:
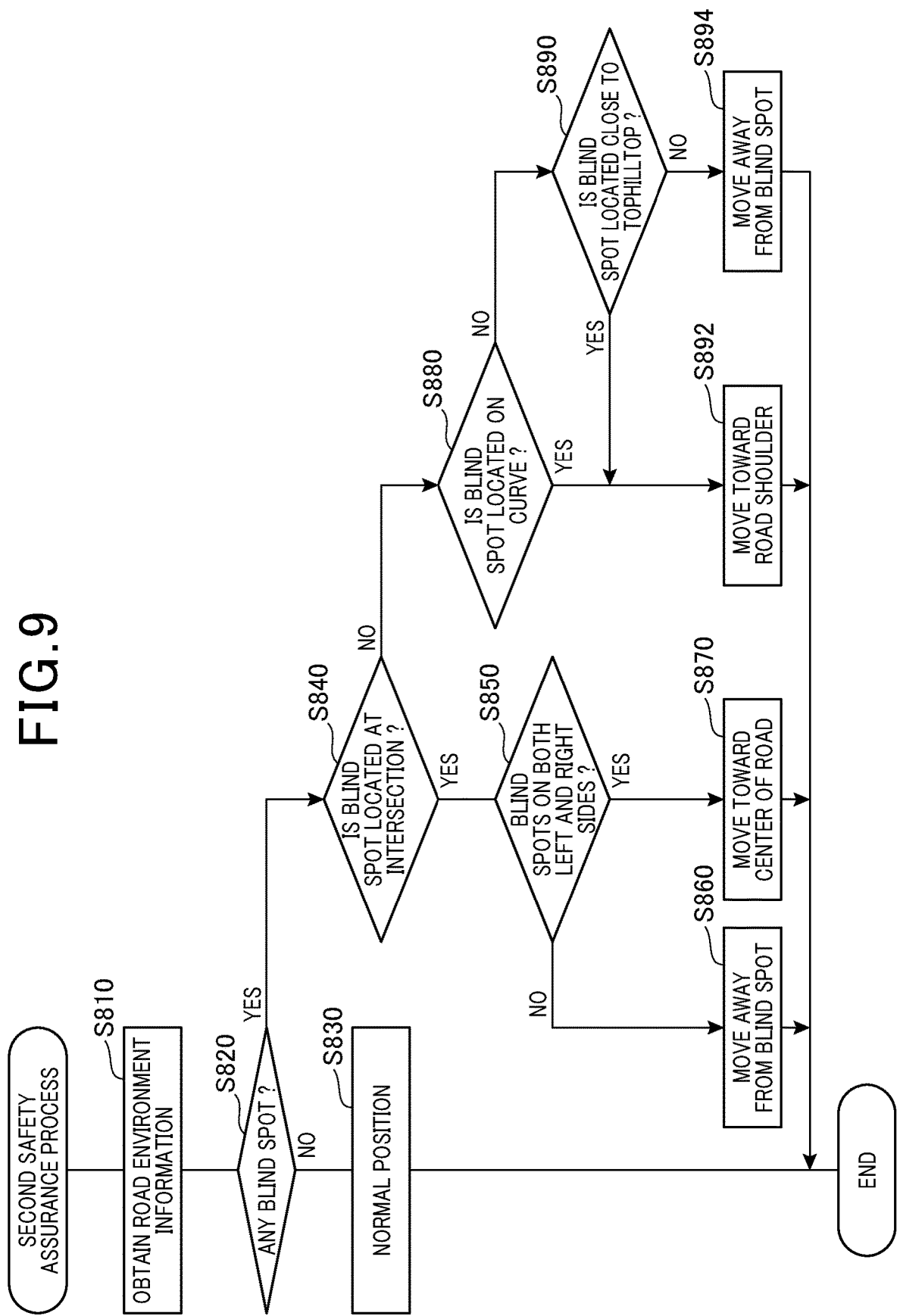
FIG. 9 is a flowchart showing a second safety assurance process.

As shown in FIG. 8, the CPU 31 proceeds to S800 after S100, and performs the second safety assurance process. The second safety assurance process is for assuring human safety and safety including avoidance of collision with another vehicle. As shown in FIG. 9, when the second safety assurance process is started, the CPU 31 proceeds to S810 and obtains road environment information. Specifically, information of whether or not there is a blind spot, whether or not there is a curve in the direction of travel, whether or not the current location is close to a hilltop, and the like is obtained. The hilltop is a point where an uphill ends and turns into a level road or a downhill.

Figure 10:
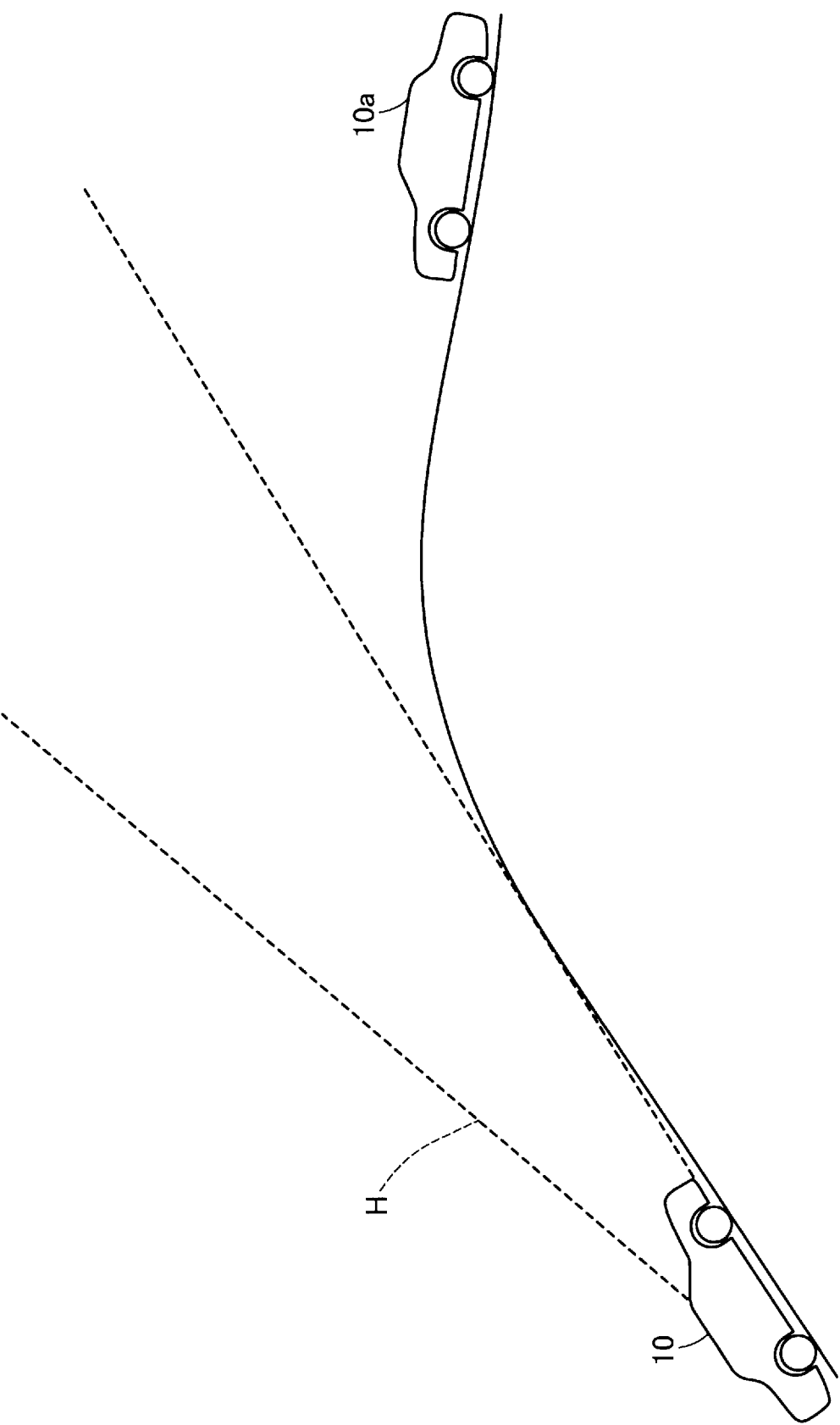
FIG. 10 shows a situation in which an autonomous vehicle is traveling close to the hilltop.

FIG. 10 shows a situation in which the autonomous vehicle 10 serving as the own vehicle faces an oncoming vehicle 10a across the hilltop. A sensing range H shown in FIG. 10 is a schematic representation of a vertical sensing range of the external sensor 23. As shown in FIG. 10, there are cases where an object located on the opposite side of the hilltop is out of the sensing range.

Next, the CPU 31 proceeds to S820 and determines whether there is a blind spot. When there is no blind spot, the CPU 31 determines S820 as "NO", proceeds to S830, determines that the current position is a normal position, and ends the second safety assurance process. At the normal position, in principle, the central position in the width direction of a vehicle matches the central position in the width direction of a traffic lane. As another example, in the case where there are no lane markings, the central position in the width direction of a vehicle is adjusted to match the center of a space through which the vehicle can physically travel.

On the other hand, when there is a blind spot, the CPU 31 determines S820 as "NO", proceeds to S840, and determines whether the blind spot is located at an intersection. When the blind spot is located at an intersection, the CPU 31 determines S840 as "YES", proceeds to S850, and determines whether there are blind spots on both the left and right sides at the intersection.

Figure 11:
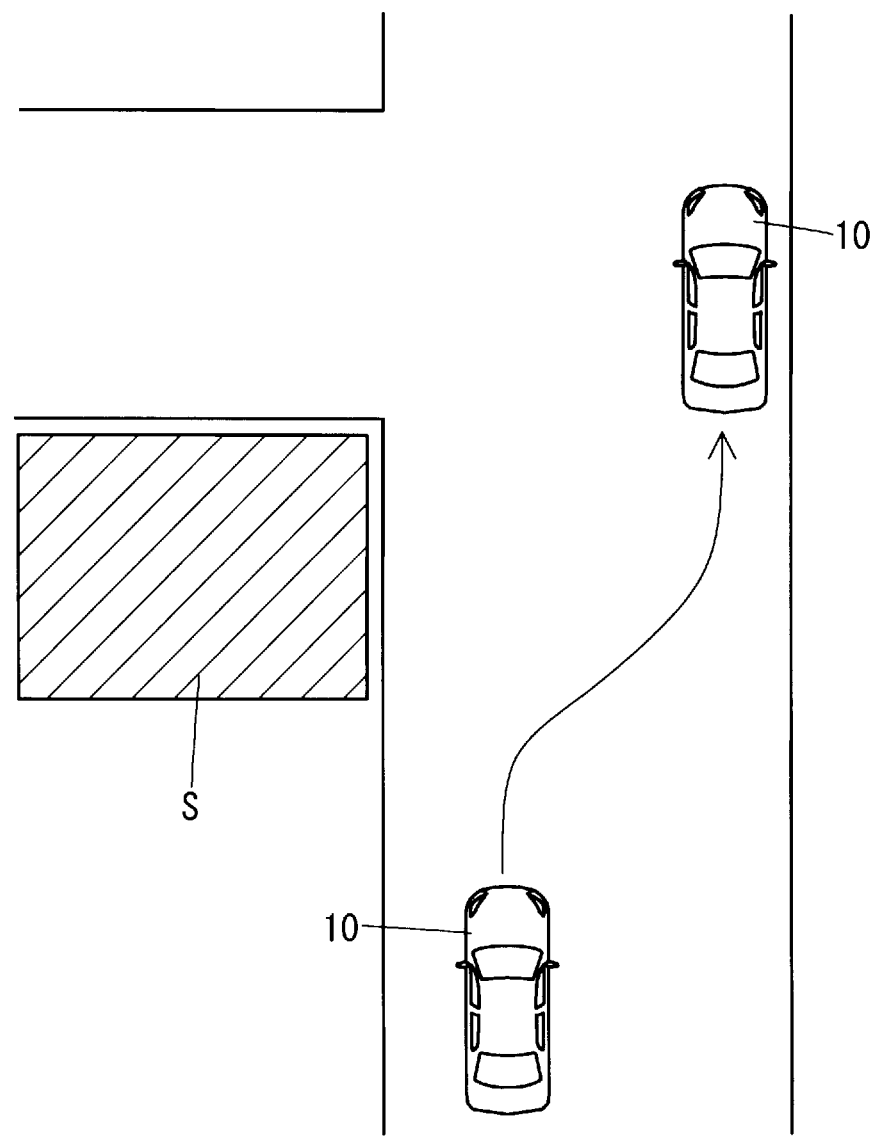
FIG. 11 shows a situation in which a travel position away from an obstacle is determined in the case of a T-junction.
Figure 12:
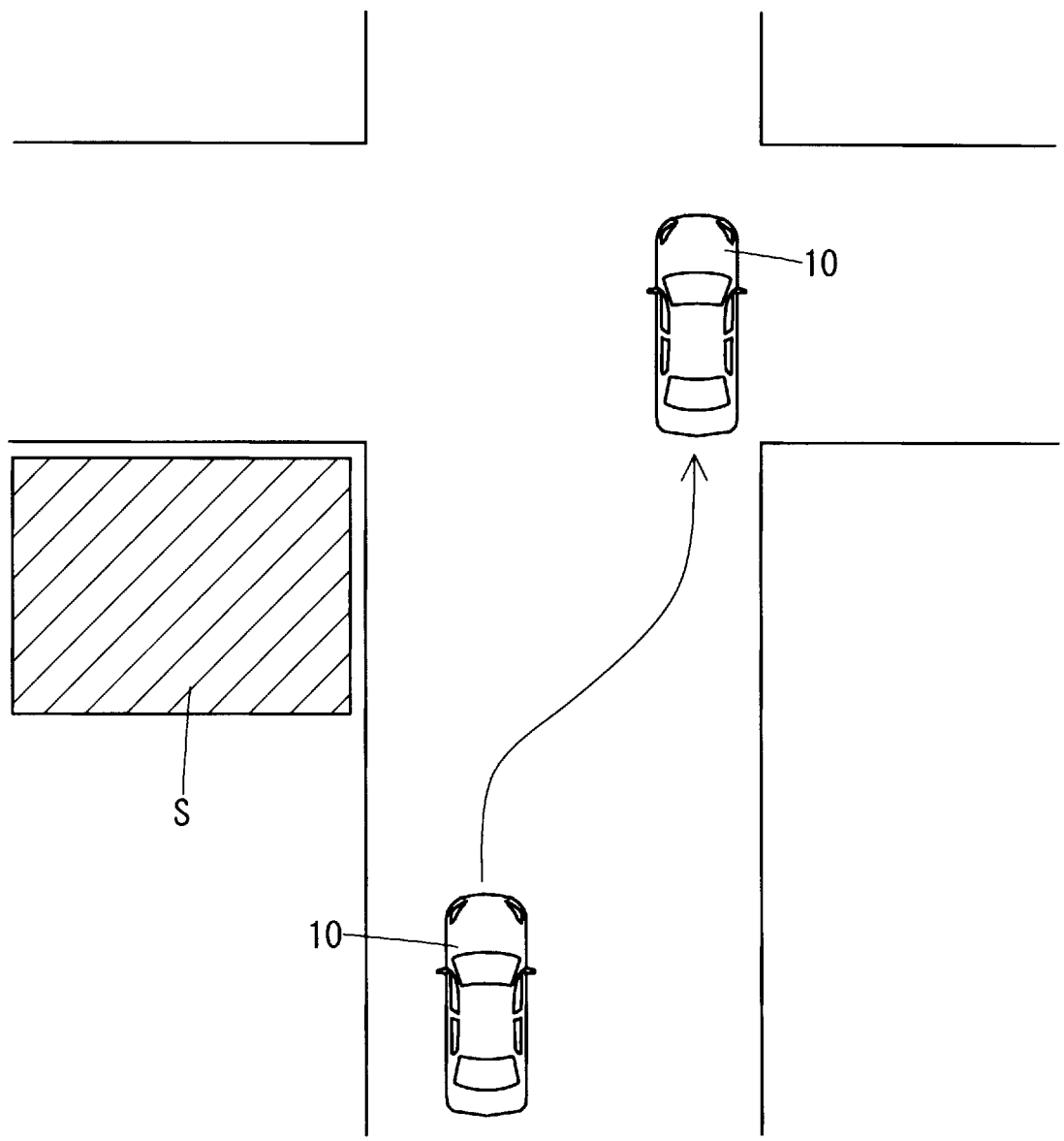
FIG. 12 shows a situation in which a travel position away from an obstacle is determined in the case of crossroads.

When there is a blind spot on one of the left and right sides, the CPU 31 determines S850 as "NO", proceeds to S860, determines a travel position away from an obstacle S, as exemplified in FIGS. 11 and 12, and ends the second safety assurance process. Even in the case of a T-junction as shown in FIG. 11 and even in the case of crossroads as shown in FIG. 12, a travel position away from the obstacle S is determined. Moving away from a blind spot allows for a reduction in the likelihood of meeting collision with a person suddenly emerged from the blind spot.

Figure 13:
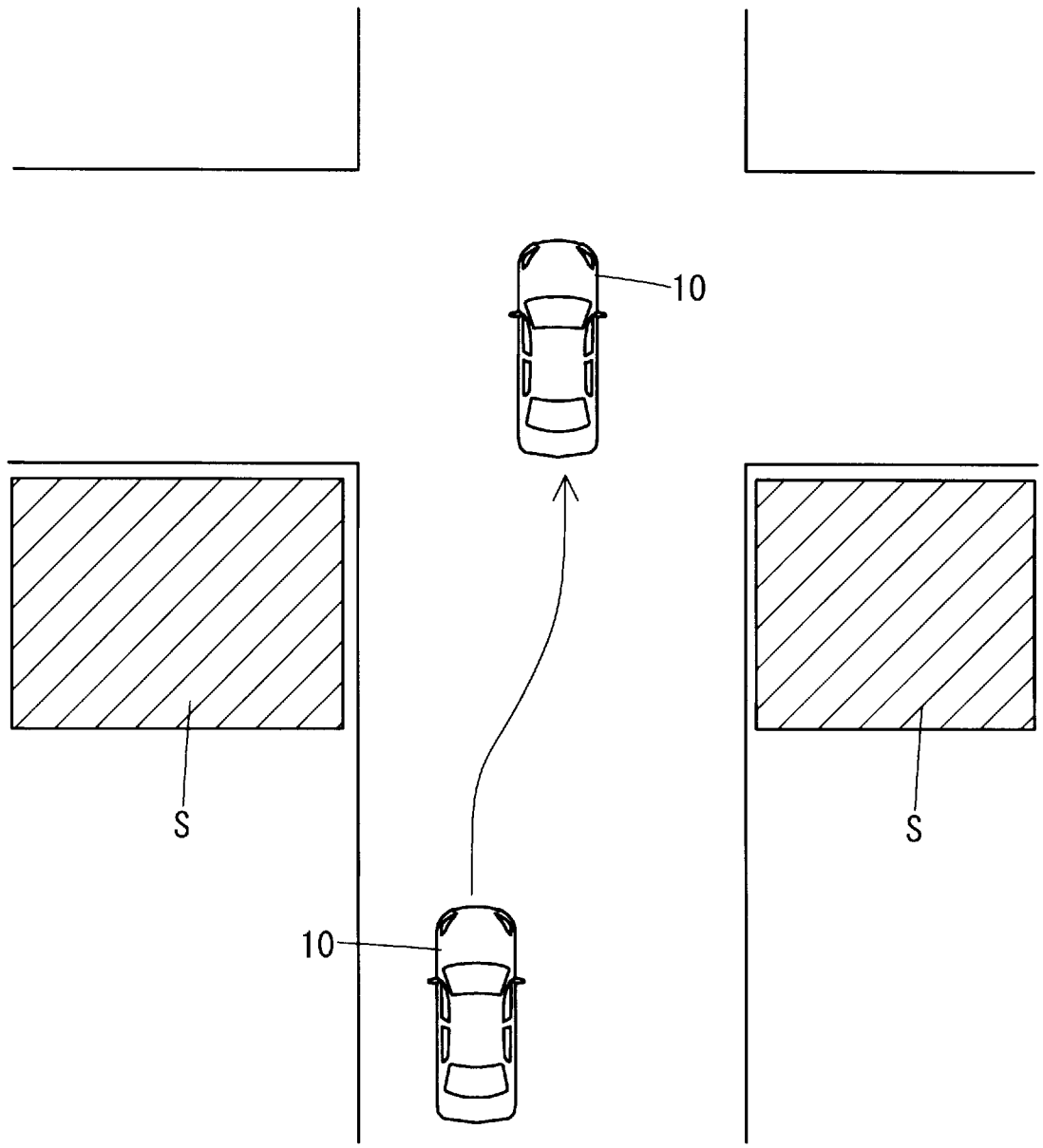
FIG. 13 shows a situation in which a travel position away from left and right obstacles is determined.

On the other hand, when there are blind spots on both the left and right sides, the CPU 31 determines S850 as "YES", proceeds to S870, determines a travel position at the center of the road, as shown in FIG. 13, and ends the second safety assurance process. When there are blind spots on both the left and right sides, safety is assured by keeping a distance from each of the blind spots.

Figure 14:
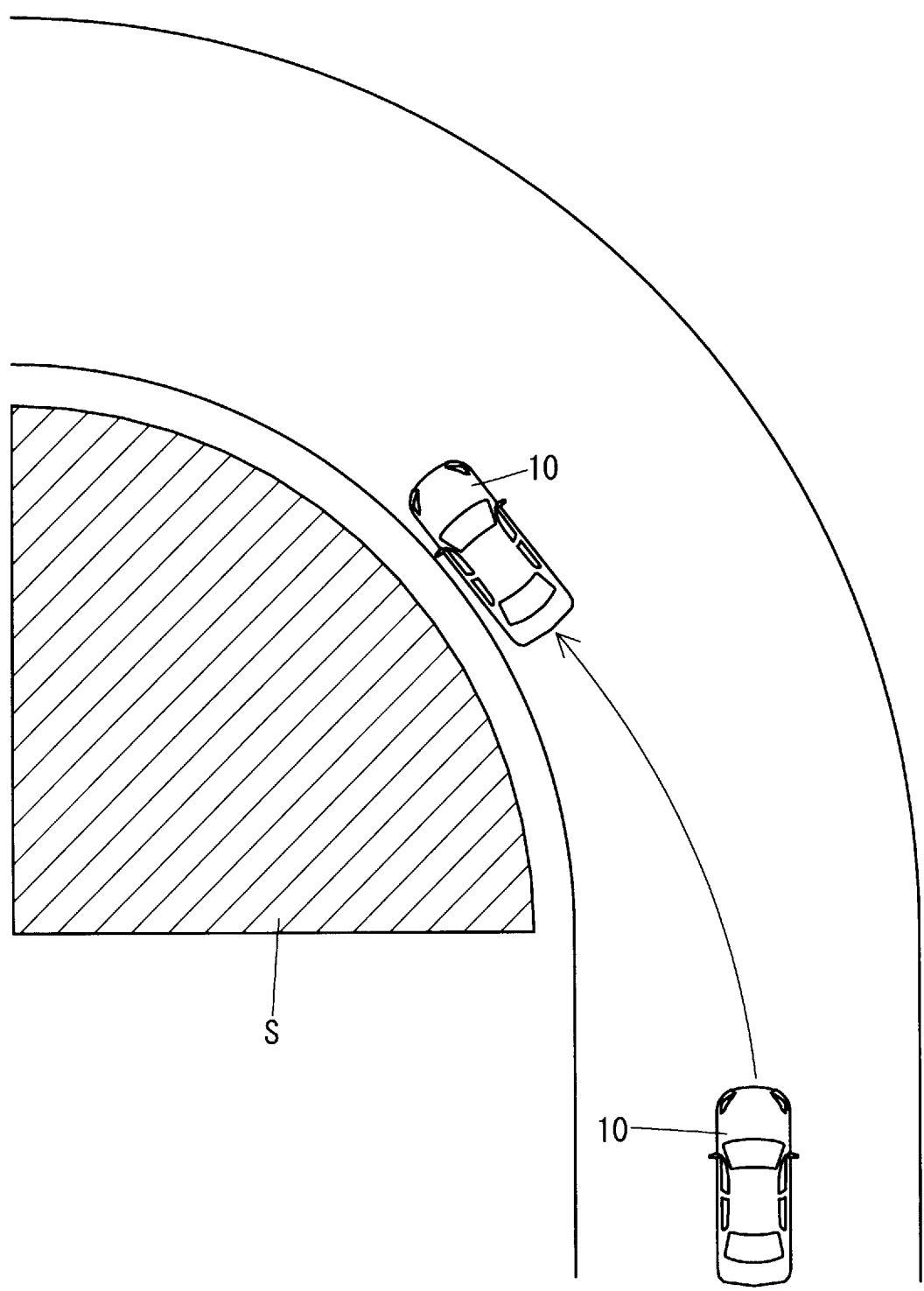
FIG. 14 shows a situation in which a travel position close to a road shoulder is determined.
Figure 15:
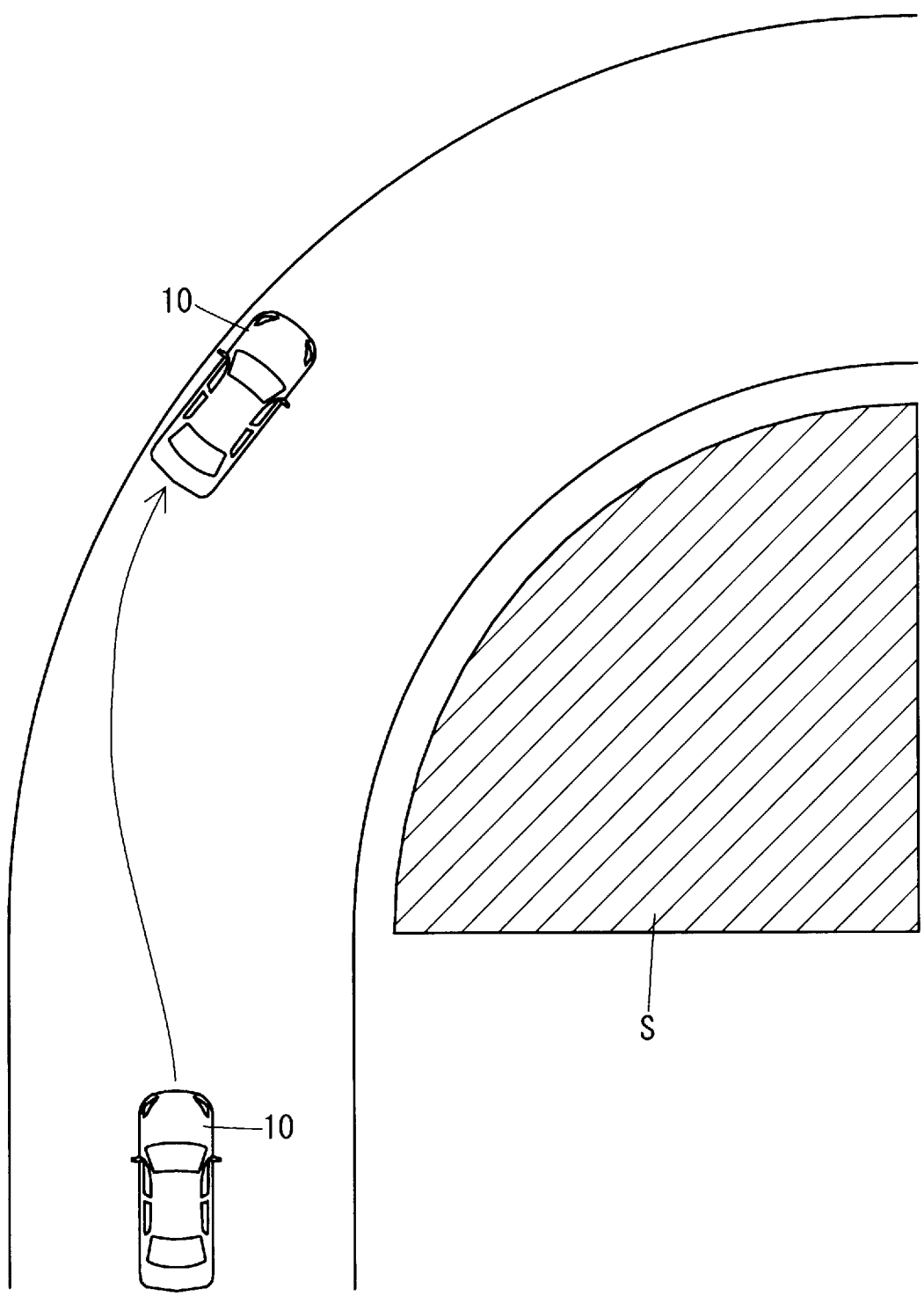
FIG. 15 shows a situation in which a travel position close to a road shoulder is determined.

On the other hand, when the blind spot is not located at an intersection, the CPU 31 determines S840 as "NO", proceeds to S880, and determines whether the blind spot is located on a curve. When the blind spot is located on a curve, the CPU 31 determines S880 as "YES", proceeds to S892, determines a travel position close to a road shoulder, as exemplified in FIGS. 14 and 15, and ends the second safety assurance process. Moving toward a road shoulder allows for a reduction in the likelihood of collision with an oncoming vehicle (for example, a two-wheeler).

When the blind spot is not located on a curve, the CPU 31 determines S880 as "NO", proceeds to S890, and determines whether the blind spot is located close to a hilltop. When the blind spot is located close to a hilltop, the CPU 31 determines S890 as "YES" and proceeds to S892. As in the case where the blind spot is located on a curve, moving toward a road shoulder allows for a reduction in the likelihood of collision with an oncoming vehicle.

Figure 16:
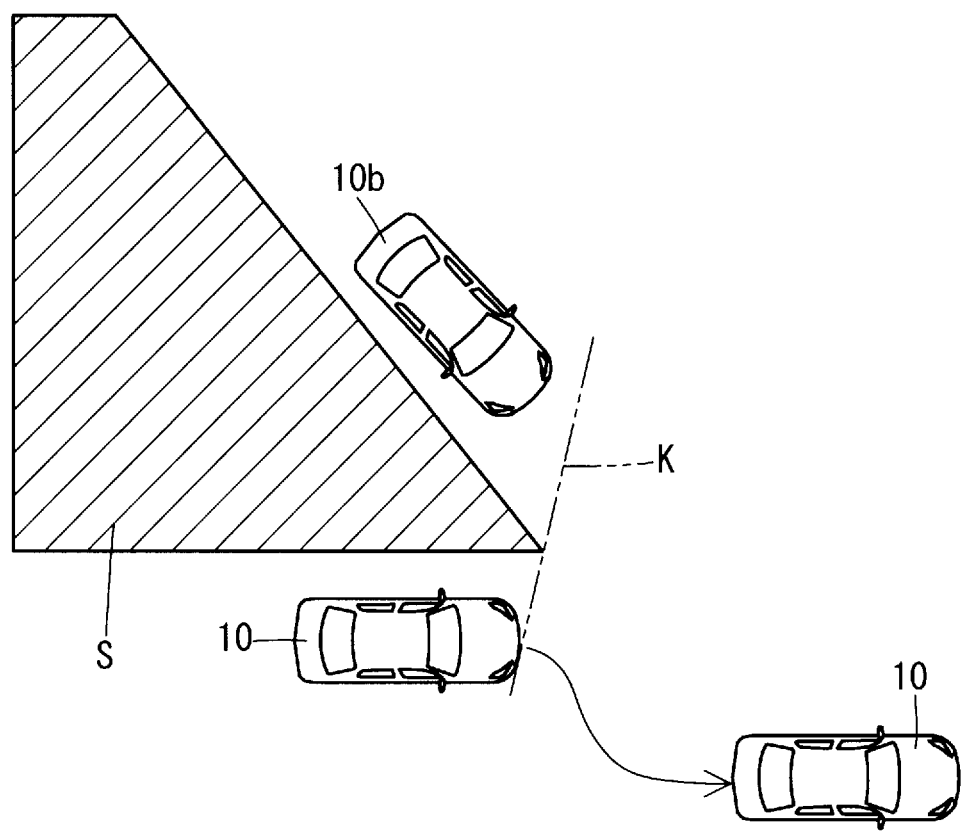
FIG. 16 shows a situation in which a travel position away from an obstacle is determined.

On the other hand, when the blind spot is not located close to a hilltop, S890 is determined as "NO", the processing proceeds to S894, a travel position away from the blind spot is determined, and the second safety assurance process is ended. For example, as shown in FIG. 16, suppose a virtual straight line K passing through a tip portion of the obstacle S and a tip portion of the autonomous vehicle 10 which is the own vehicle. At a point in time when an automobile 10*b* which is another vehicle is located behind the virtual straight line K, it is difficult for the external sensor 23 of the autonomous vehicle 10 to detect the automobile 10*b*. In anticipation of such a situation, a travel position away from an obstacle creating a blind spot is determined in S894.

According to the third embodiment described above, safety is further assured as a result of the determination of a travel position in the second safety assurance process.

Forth Embodiment

The fourth embodiment will be described. Description of Embodiment 4 will focus on differences from the third embodiment. Features not particularly described are the same as those in the third embodiment.

Figure 17:
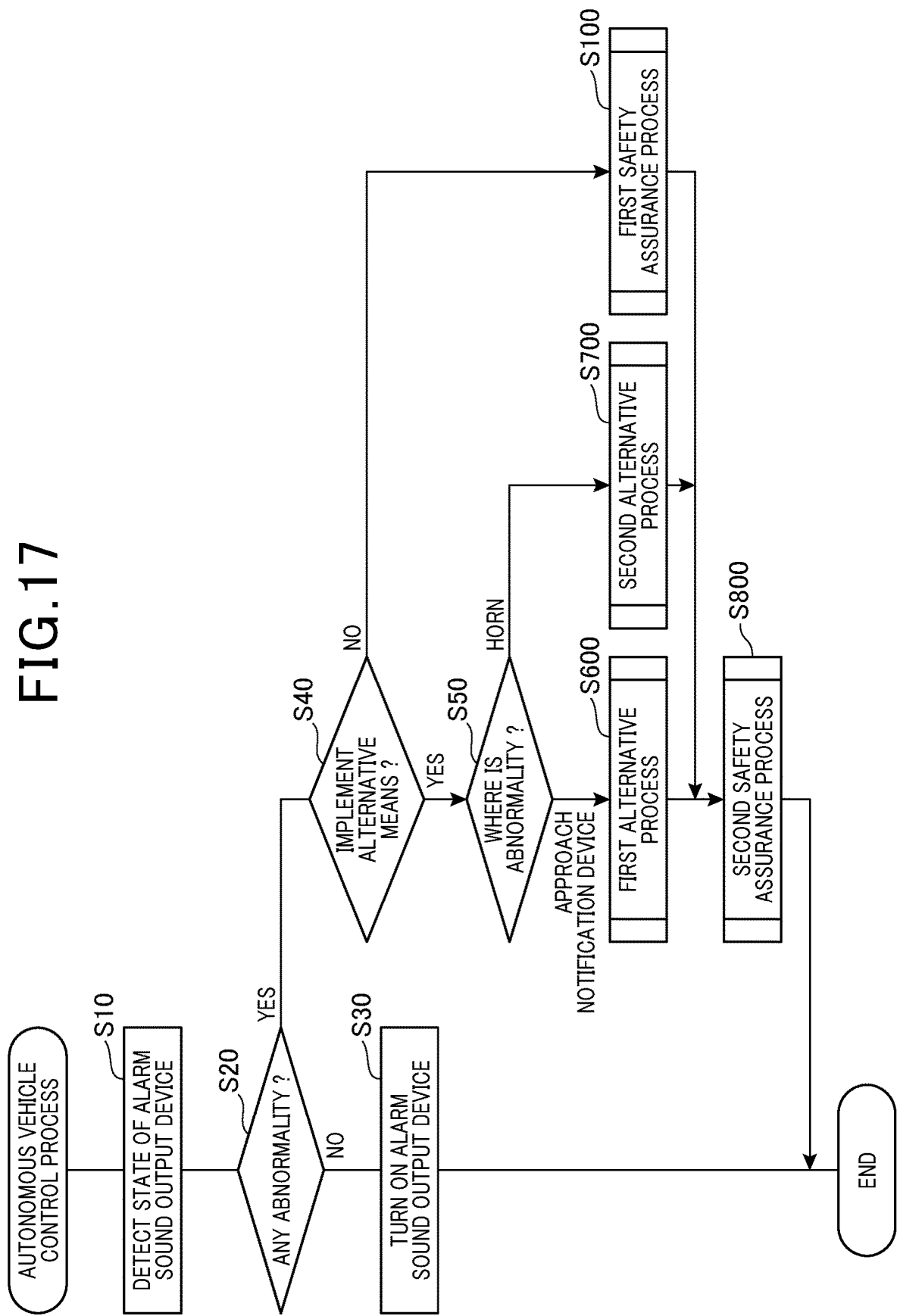
FIG. 17 is a flowchart showing an autonomous vehicle control process according to a fourth embodiment.

As shown in FIG. 17, when there is an abnormality in the alarm sound output device 50, the CPU 31 determines S20 as "NO", proceeds to S40, and determines whether to implement an alternative means. In other words, whether or not to assure safety by another method without performing the first safety assurance process is determined.

As a specific method of this determination in the present embodiment, if there is any designation of implementation of an alternative means by a driver, the determination is made on the basis of said designation, and if there is no such designation, the first safety assurance process is performed without performing alternative processes. In another embodiment, for example, when the same determination step as S110 in the first safety assurance process is performed and the result thereof is negative, specifically, when there is no vehicle nearby that is traveling in the same direction, an alternative process may be performed, and otherwise the first safety assurance process may be performed. When the alternative means is not implemented, the CPU 31 determines S40 as "NO", proceeds to S100, performs the first safety assurance process, proceeds to S800, and performs the second safety assurance process.

On the other hand, when the alternative means is implemented, whether the abnormality has occurred in the approach notification device 51 or the horn 52 is determined. When the approach notification device 51 has the abnormality, the CPU 31 proceeds from S50 to S600 and performs a first alternative process. The first alternative process is performed when an operating condition of the approach notification device 51 is satisfied. Although the first alternative process will be described with reference to a flowchart, execution of each step starts at approximately the same time. Note that in the present embodiment, all the steps are executed, but in another embodiment, it is sufficient that at least one of the steps be executed.

As shown in FIG. 18, when the first alternative process is started, the CPU 31 proceeds to 610 and turns ON the headlight 71. Note that in another embodiment, S610 is not required to be performed when the surrounding area is light.

Next, the CPU 31 proceeds to S620, controls the indicator 72, and causes hazard lights to flash. Next, the CPU 31 proceeds to S630 and sounds the horn 52. Note that in another embodiment, the horn 52 may be sounded only at a location where there is a blind spot (for example, an intersection) or the horn 52 may be periodically sounded.

Next, the CPU 31 proceeds to S640 and opens the windows adjacent to the driver seat and the front passenger seat using the power window motor 63. Note that in another embodiment, the windows are not required to be opened or one of the windows may be opened. Next, the CPU 31 proceeds to S650 and outputs, from the audio system 62, sound serving as an alarm sound. The window is opened in S640 so that the sound from the audio system 62 can be heard from a location outside of the vehicle. Note that if a condition for performing the first alternative process is no longer satisfied, the window can be closed.

Next, the CPU 31 proceeds to S660 and increases the rotational speed of the internal combustion engine 41. In the present embodiment, increasing the rotational speed incudes starting the internal combustion engine 41 that has not been in motion. The purpose of S660 is to increase the volume of sound which the internal combustion engine 41 emits so that the sound serves as an alarm sound. Note that in the case of increasing the rotational speed of the internal combustion engine 41, the transmission gear ratio is adjusted to keep the vehicle speed from becoming too high, or the gear is set to the neutral position so that the torque of the internal combustion engine 41 is not transmitted to the wheels. In both the case of adjusting the transmission gear ratio or the case of setting the gear to the neutral position, the vehicle speed is controlled using the travel motor 43, as appropriate.

Next, the CPU 31 proceeds to S670, changes the carrier frequency of the inverter (specifically, reduces the carrier frequency), and ends the first alternative process. The purpose of S670 is to increase the volume of sound which the travel motor 43 emits so that the sound serves as an alarm sound.

On the other hand, as shown in FIG. 17, when the horn 52 has the abnormality, the processing proceeds from S50 to S700, and a second alternative process is performed. The second alternative process is performed when an operating condition of the horn 52 is satisfied. Although the second alternative process will be described with reference to a flowchart, execution of each step starts at approximately the same time. Note that in the present embodiment, all the steps are executed, but in another embodiment, it is sufficient that at least one of the steps be executed.

In the first alternative process and the second alternative process, the same processing is performed in steps denoted by step numerals having the same values in the last two digits. Description of such a step in which the same processing is performed in the second alternative process will be omitted. Note that the second alternative process does not include a step corresponding to S630. This is because the step corresponding to S630 cannot be performed when the horn 52 is abnormal.

After S710, the CPU 31 proceeds to S715 and starts periodical switching between the high beam and the low beam of the headlight 71. S715 is performed in order to enhance the degree of warning.

After S720, the CPU 31 proceeds to S725 and makes the flash period of the hazard lights shorter than usual. S725 is performed in order to enhance the degree of warning.

Note that in S750, S760, and S770, the sound may be set louder than in the corresponding steps in the first alternative process, in order to enhance the degree of warning.

According to the third embodiment described above, safety can be assured by the alternative means using devices included in the own vehicle. The first and second alternative processes are particularly effective, for example, in the case where linkage with another vehicle is not possible.

Correspondence between the embodiments and the claims will be described. S20 is performed by the determination unit 31a. S100, S600, S700, and S800 are performed by the safety assurance unit 31b.

Modifications

The present disclosure is not limited to the embodiments in this Description and can be implemented with various configurations within the spirit and scope of the present disclosure. For example, technical features in the embodiments that correspond to technical features of the aspects described in the Summary section can be replaced or combined, as appropriate, in order to solve part or all of the earlier-described problems or in order to achieve part or all of the earlier-described advantageous effects. Technical features can be deleted, as appropriate, unless the technical features are explained in this Description as essential. The following embodiments are given by example.

The alarm sound output device 50 may include only the approach notification device 51 or the horn 52. In the case where the alarm sound output device 50 includes only the approach notification device 51 or the horn 52, the autonomous driving restriction process may be changed as appropriate. Specifically, when only the approach notification device 51 is included, S400 (that is, the second determination process) is not performed, and thus S270 and S400 are omitted.

The first and second alternative processes may be performed at the same time as the first safe assurance process.

One of the plurality of determination steps in the first and second determination processes may be omitted as appropriate.

The autonomous vehicle 10 is not required to be equipped with one of the internal combustion engine 41 and the travel motor 43. In this case, S660 and S670 in the first alternative process, S760 and S770 in the second alternative process, etc., are omitted as appropriate.

In the above-described embodiments, part or all of the functions and processes implemented using software may be implemented using hardware. Furthermore, part or all of the functions and processes implemented using hardware may be implemented using software. Examples of usable hardware include various circuits such as an integrated circuit, a discrete circuit, and a circuit module obtained by combining these circuits.

What is claimed is:

1. An autonomous vehicle control device for controlling an own vehicle that is an autonomous vehicle including an alarm sound output device which outputs an alarm sound for at least a person, the autonomous vehicle control device comprising:

a determination unit configured to determine whether there is an abnormality in the alarm sound output device during execution of autonomous driving; and a safety assurance unit configured to, when the determination unit determines that there is an abnormality in the alarm sound output device, perform a safety assurance process for assuring human safety, wherein the safety assurance process includes at least one of:

prohibiting autonomous driving when there is a driver in the autonomous vehicle;

limiting a speed of the own vehicle;

prohibiting passing another vehicle; and controlling a travel position according to a road condition in a direction of travel, the travel position being a widthwise position in a traffic lane.

2. The autonomous vehicle control device according to claim 1, wherein the safety assurance unit is configured to, when there is one of a blind spot and an intersection within a predetermined distance in a direction of travel, perform the safety assurance process.

3. The autonomous vehicle control device according to claim 1, wherein the safety assurance unit is configured to, when a road on which the own vehicle is traveling has a structure satisfying a specific condition, perform the safety assurance process.

4. The autonomous vehicle control device according to claim 1, wherein the safety assurance unit is configured to, when a person is detected in a direction of travel, perform the safety assurance process.

5. The autonomous vehicle control device according to claim 1, wherein the safety assurance unit is configured to perform, when there is another vehicle nearby that is traveling in the same direction as the own vehicle and sound which the other vehicle emits has a volume lower than or equal to a predetermined value, the safety assurance process.

6. An autonomous vehicle control device for controlling an own vehicle that is an autonomous vehicle including an alarm sound output device which outputs an alarm sound for at least a person, the autonomous vehicle control device comprising:

a determination unit configured to determine whether there is an abnormality in the alarm sound output device during execution of autonomous driving; and a safety assurance unit configured to, when the determination unit determines that there is an abnormality in the alarm sound output device, perform a safety assurance process for assuring human safety, wherein the autonomous vehicle includes an internal combustion engine, and the safety assurance unit is configured to increase i-a rotational speed of the internal combustion engine as the safety assurance process.

7. An autonomous vehicle control device for controlling an own vehicle that is an autonomous vehicle including an alarm sound output device which outputs an alarm sound for at least a person, the autonomous vehicle control device comprising:

a determination unit configured to determine whether there is an abnormality in the alarm sound output device during execution of autonomous driving; and a safety assurance unit configured to, when the determination unit determines that there is an abnormality in the alarm sound output device, perform a safety assurance process for assuring human safety, wherein the autonomous vehicle includes a travel motor and an inverter that drives the travel motor, and the safety assurance unit is configured to change a carrier frequency of the inverter as the safety assurance process.

8. An autonomous vehicle control device for controlling an own vehicle that is an autonomous vehicle including an alarm sound output device which outputs an alarm sound for at least a person, the autonomous vehicle control device comprising:

a determination unit configured to determine whether there is an abnormality in the alarm sound output device during execution of autonomous driving; and a safety assurance unit configured to, when the determination unit determines that there is an abnormality in the alarm sound output device, perform a safety assurance process for assuring human safety, wherein the autonomous vehicle includes a light-emitting device which emits light outward, and the safety assurance unit is configured to cause the light-emitting device to emit light as the safety assurance process.

9. An autonomous vehicle control device for controlling an own vehicle that is an autonomous vehicle including an alarm sound output device which outputs an alarm sound for at least a person, the autonomous vehicle control device comprising:

a determination unit configured to determine whether there is an abnormality in the alarm sound output device during execution of autonomous driving; and a safety assurance unit configured to, when the determination unit determines that there is an abnormality in the alarm sound output device, perform a safety assurance process for assuring human safety, wherein the alarm sound output device includes a horn and an approach notification device which emits an alarm sound for persons under a predetermined condition, and the safety assurance unit is configured to, when an abnormality occurs in the approach notification device, use the horn to output sound under the predetermined condition as the safety assurance process.

10. An autonomous vehicle control device for controlling an own vehicle that is an autonomous vehicle including an alarm sound output device which outputs an alarm sound for at least a person, the autonomous vehicle control device comprising:

a determination unit configured to determine whether there is an abnormality in the alarm sound output device during execution of autonomous driving; and a safety assurance unit configured to, when the determination unit determines that there is an abnormality in the alarm sound output device, perform a safety assurance process for assuring human safety, wherein the safety assurance unit is configured to restrict autonomous driving as the safety assurance process.

11. The autonomous vehicle control device according to claim 10, wherein the safety assurance unit is configured to limit a speed of the own vehicle as the safety assurance process.

12. The autonomous vehicle control device according to claim 10, wherein the safety assurance unit is configured to prohibit passing another vehicle as the safety assurance process.

* * * * *